United States Patent [19]

Allen

[11] 4,258,083
[45] Mar. 24, 1981

[54] TREAD END CEMENTER

[75] Inventor: Ronald E. Allen, Tuscaloosa, Ala.

[73] Assignee: The BF Goodrich Company, Akron, Ohio

[21] Appl. No.: 24,648

[22] Filed: Mar. 28, 1979

Related U.S. Application Data

[62] Division of Ser. No. 854,561, Nov. 25, 1977, Pat. No. 4,173,198.

[51] Int. Cl.³ ............................................. B05D 1/02
[52] U.S. Cl. ................................. 427/209; 427/208; 427/345; 427/421; 427/424
[58] Field of Search ............... 427/209, 345, 421, 424, 427/208

[56] References Cited

U.S. PATENT DOCUMENTS

| 2,041,765 | 5/1936 | Howell | 118/314 X |
| 2,486,877 | 11/1949 | Ransburg et al. | 118/326 X |
| 3,220,379 | 11/1965 | Wallis | 118/314 X |
| 3,252,401 | 5/1966 | Smith | 118/326 X |
| 3,467,063 | 9/1969 | Brinkley et al. | 118/314 X |
| 3,475,202 | 10/1969 | Bok | 427/424 X |
| 3,704,165 | 11/1972 | McLain et al. | 427/424 X |
| 3,986,476 | 10/1976 | Yano | 118/314 X |

FOREIGN PATENT DOCUMENTS 708491 7/1941 Fed. Rep. of Germany ........... 427/424

Primary Examiner—Shrive P. Beck
Attorney, Agent, or Firm—Joseph Januszkiewicz

[57] ABSTRACT

A conveyor means moves spaced treads along a horizontal path defining a pass line where longitudinally spaced spray means are actuated by control means to spray the tapered leading and trailing edges of the treads. An overspray collection means is located adjacent to each spray area to control the overspray. The overspray collection is automated to present a new surface after a predetermined number of sprays to assure an uncontaminated work zone at the site of the overspray.

3 Claims, 9 Drawing Figures

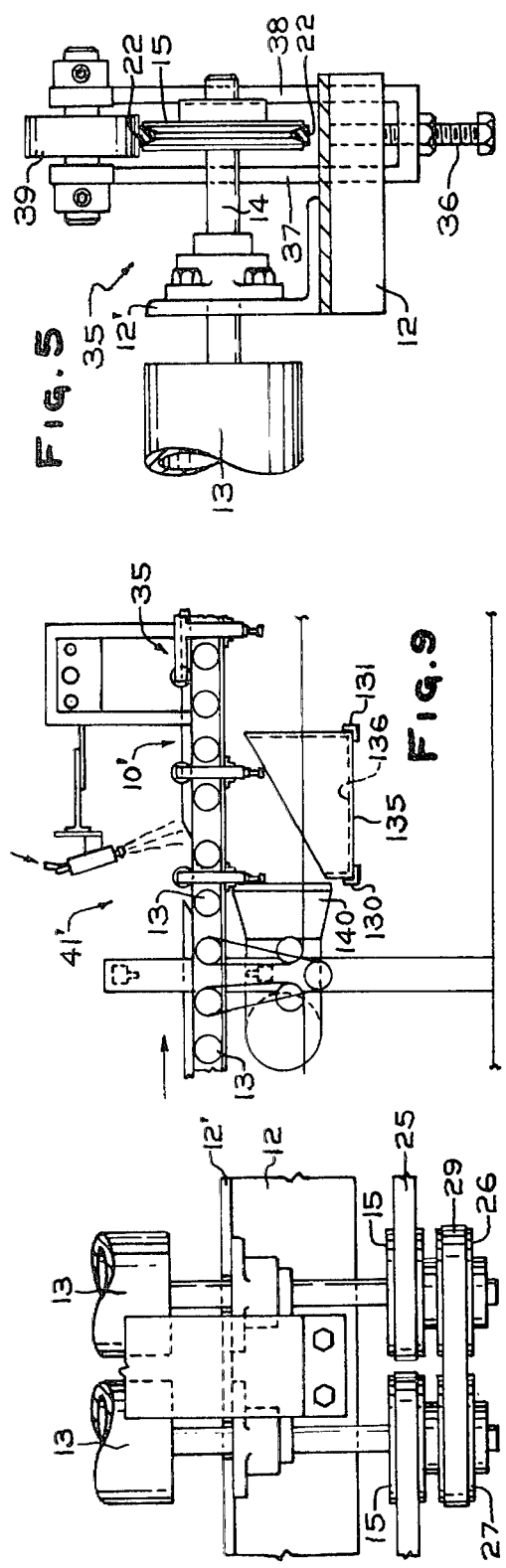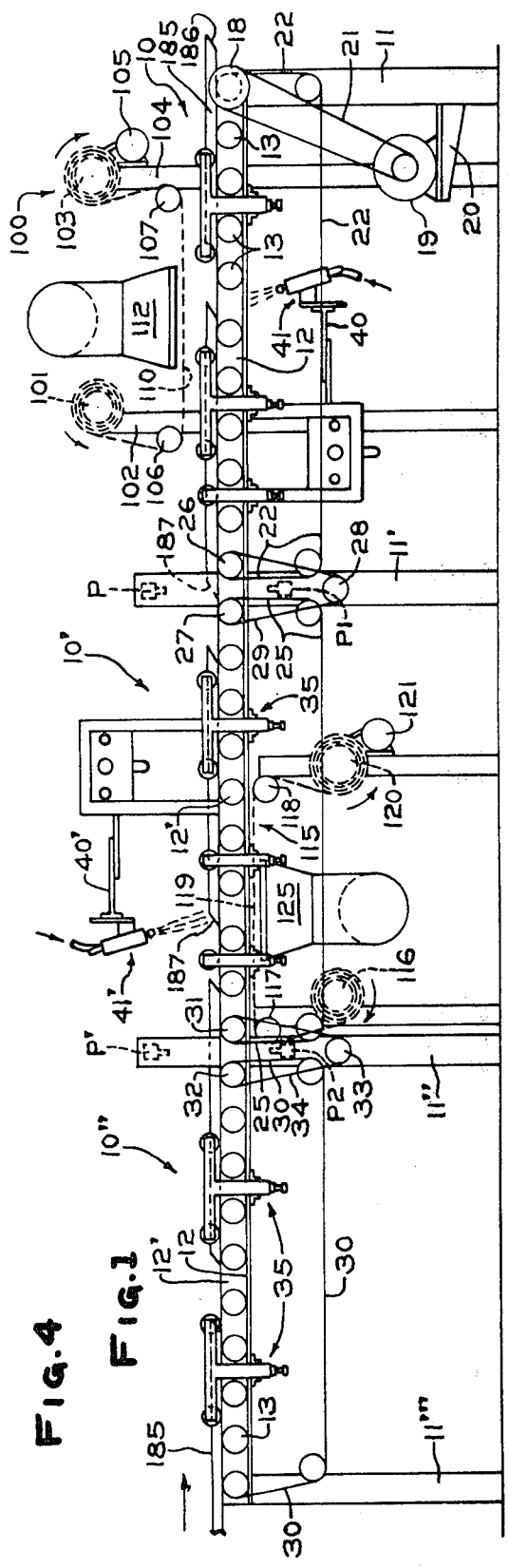

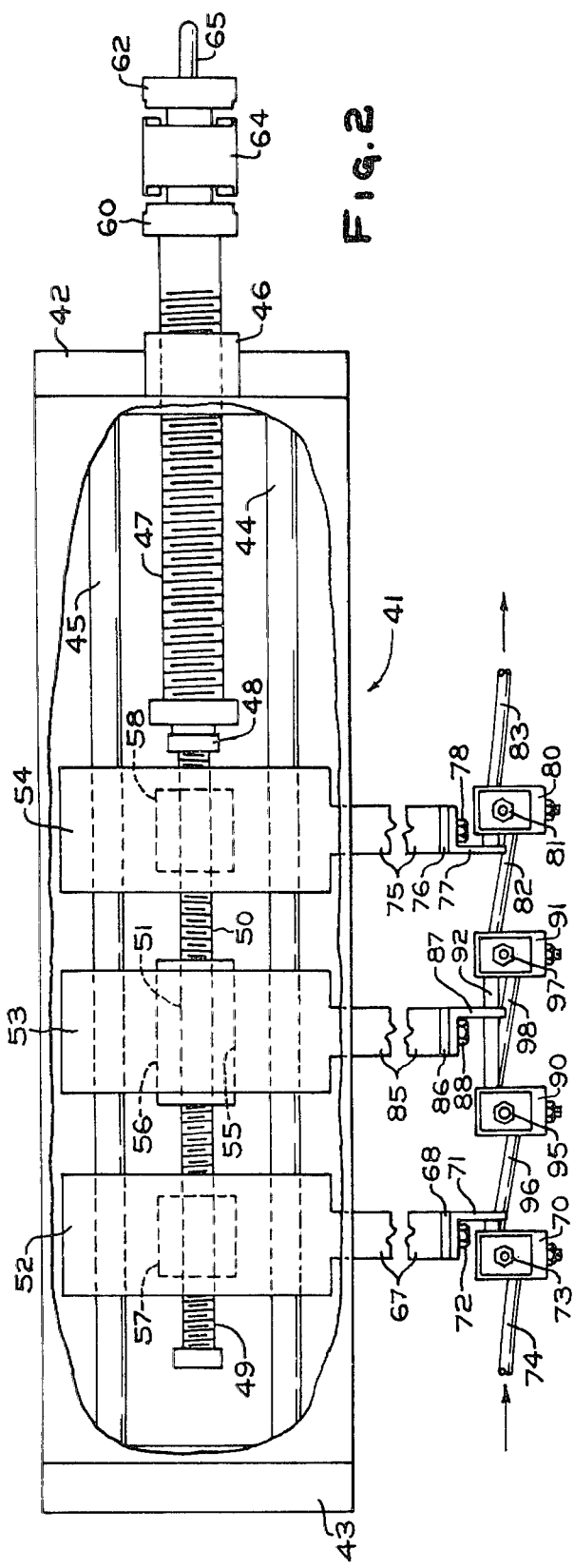
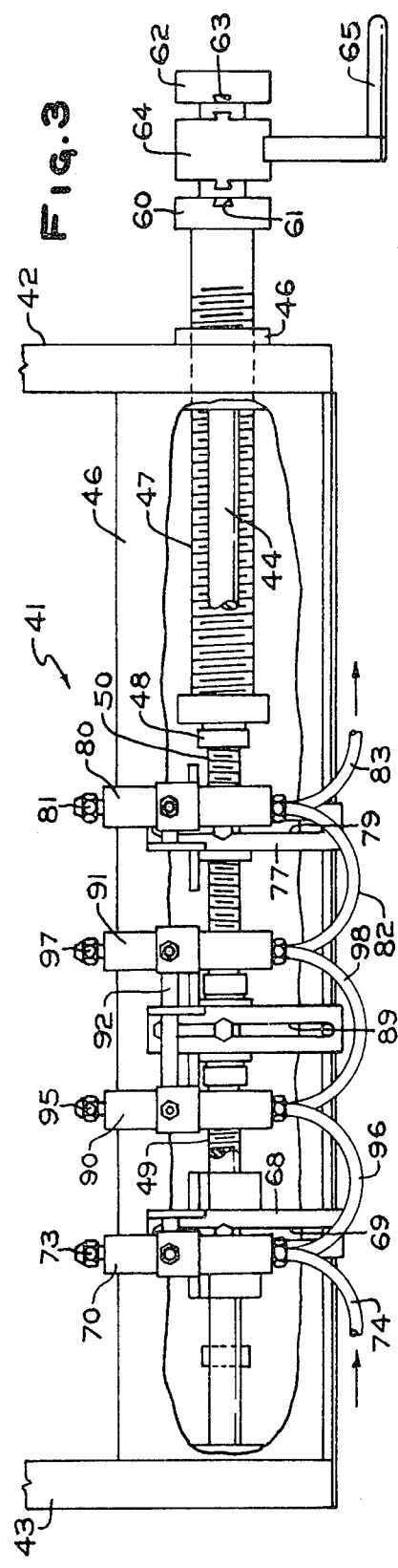

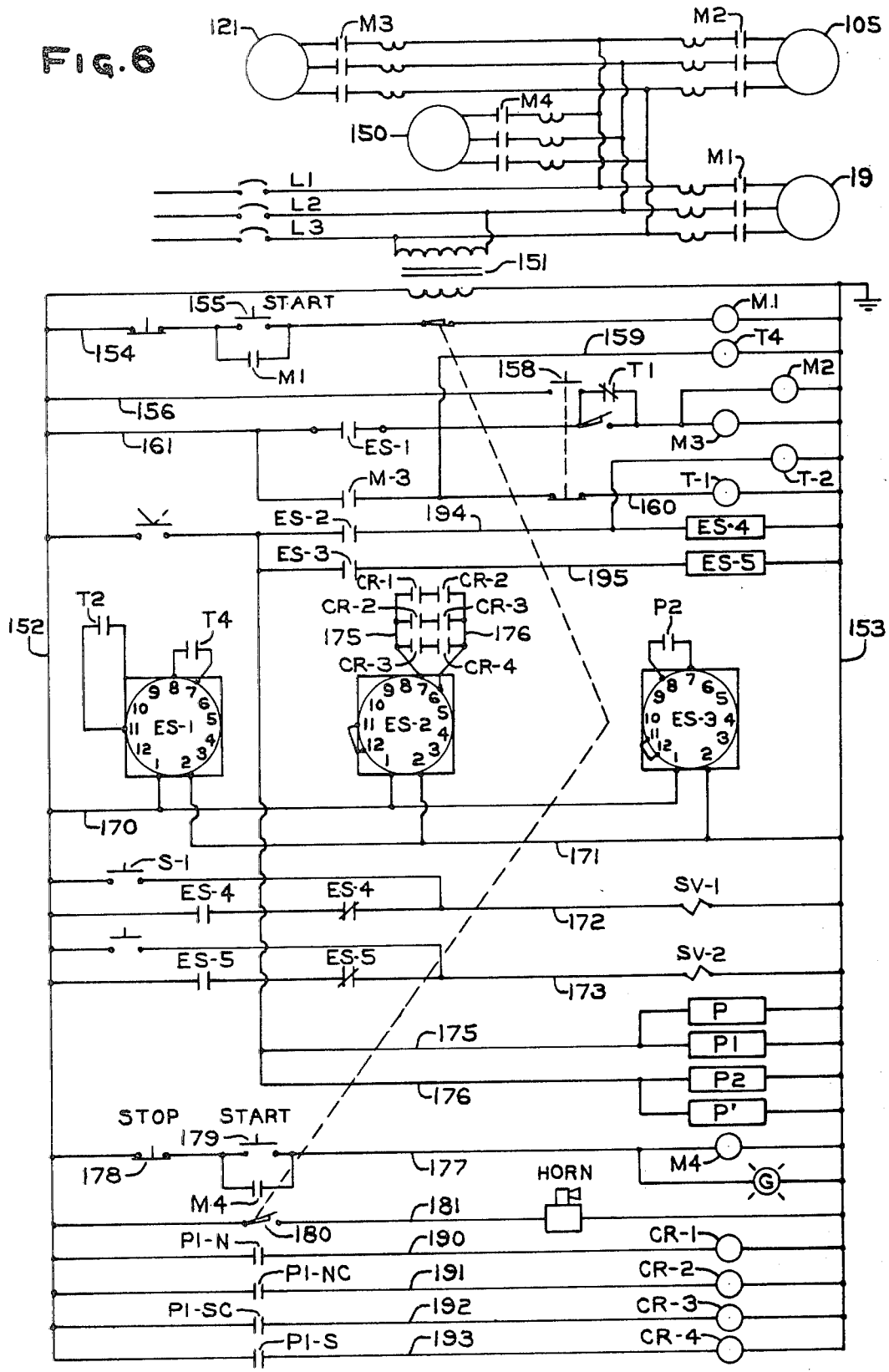

TREAD END CEMENTER

This is a division, of application Ser. No. 854,561, filed Nov. 25, 1977 now U.S. Pat. No. 4,173,198.

BACKGROUND OF THE INVENTION

This invention relates to a new and improved tread end cementer wherein the respective tread ends are sprayed with cement or cement adhesive while the tread is being conveyed.

In the manufacture of tires, it is desirable to automate the tire building process to reduce the cost of manufacture. In the manufacture of suitable tread stock, material is discharged in the form of an endless tread strip of a desired cross-sectional configuration. In some instances the tread strip material was wound up and thence applied from such roll onto a tire carcass at the tire building drum. In other instances it cut into desired lengths because the amount of tread material could be more accurately weighed and measured. In these instances the respective end portions are cut at opposite angle such that the tread can be applied circumferentially around a tire carcass with the respective ends spliced together. In this latter process it became necessary or desirable to apply cement on the respective contoured tapered ends to facilitate the butt splice. The present invention provides the means for applying cement into the respective end portions while the tread is being conveyed without interrupting the conveying of such material. Further, such means provides controls to eliminate overapplication of the cement adhesive by controlling the overspray area.

SUMMARY OF THE INVENTION

The present invention comprises a conveying means operative to convey spaced treads, wherein horizontally spaced sprays means actuated by timed controls means spray the tapered end portions of the tread to condition them for application to a tire carcass. Overspray is collected onto a suitable cloth which is wound up onto a roll as uncontaminated cloth replaces the contaminated cloth.

BRIEF DESCRIPTION OF THE DRAWINGS

FIG. 1 is a schematic side elevational view on a reduced scale of the apparatus in accordance with the present invention.

FIG. 2 is an enlarged plan view of the spray apparatus with a portion broken away.

FIG. 3 is a front elevational view of the spray apparatus with a portion broken away.

FIG. 4 is an enlarged plan view of the belt drive means for the conveyor of the apparatus shown in FIG. 1.

FIG. 5 is an enlarged front elevational view of a portion of the belt drive tensioning means.

FIG. 6 is an electrical circuit diagram of the apparatus.

FIG. 9 is a side elevational view of a modified form of spray collection means.

DETAILED DESCRIPTION

Figure 8:
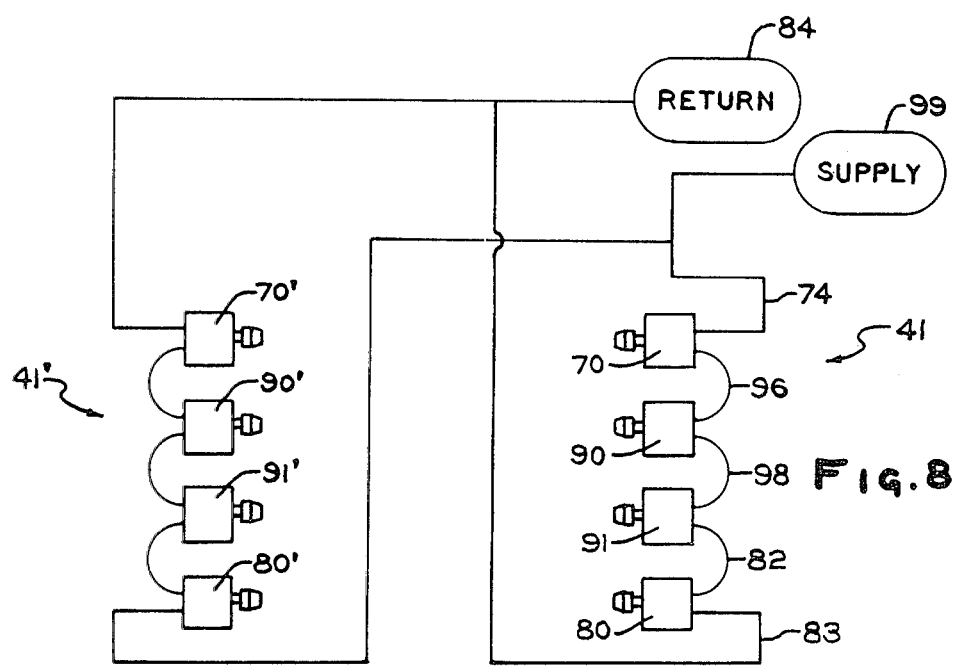
FIG. 8 is a schematic piping diagram of the cement and spraying units of the apparatus.

Referring to the drawings wherein like reference numerals designate like or corresponding parts throughout the several views, there is shown in FIG. 1 a conveying means composed of three sections, 10, 10' and 10" interconnected to provide a positive drive for the respective rollers. The first conveyor section 10 has a pair of vertically disposed frame members 11 and 11' supporting a pair of horizontally disposed frame members 12 (only one shown) and its supporting angle beam 12' which journals for rotation rollers 13. The rollers as shown in FIG. 5 are supported for rotation on shafts 14, which shafts 14 have a V-belt pulley 15 keyed to the end portion thereof.

The roller 13 and the shaft 14 at the one end of the conveying means described has a drive pulley 18 thereon in addition to pulley 15. A motor 19 mounted on a support 20 attached to vertical support 11 has its output connected via a belt 21 to the drive pulley 18. A V-belt 22 trained about pulleys 15 drive their respective shafts 14 and rollers 13.

The second conveyor section 10' has a pair of vertical supports 11" on one end and a pair of vertical supports 11' on the other end, which supports 11' are shared with the first conveyor section 10. Vertical supports 11' and 11' support the intermediate portion of horizontally disposed frame members 12. As in the first discussed conveyor section 10, horizontally disposed frame members 12 support for rotation rollers 13, shafts 14, and their respective pulleys 15. All of the pulleys 15 are interconnected by V-belt 25.

To transfer the drive from the first conveyor section 10 to the second conveyor section 10' the following means are provided. A pulley 26 (FIG. 4) is keyed to the shaft 14 at the other end of the first conveyor section 10 and another pulley 27 is keyed to the shaft 14 at the one end of the second conveyor section 10'. Mounted in vertical alignment with pulleys 26 and 27 on vertical support 11" is another pulley 28 such that a V-belt 29 trained about pulleys 26-27-28 will transfer the power from V-belt 22 of conveyor section 10 to V-belt 25 of conveyor section 10'.

The third conveyor section 10" has the pair of vertical supports 11" on one end and a pair of vertical supports 11" on the other end. Supports 11" of the second conveyor section 10' are shared with the third conveyor section 10". Vertical supports 11'" and 11'" support the other end portion of horizontally disposed frame members 12, assuming frame member 12 is one continuous member; however, member 12 may be composed of a plurality of sections connected end to end to provide a unitary conveyor frame support. As in the first and second discussed conveyor sections 10 and 10', horizontally frame members 12 support for rotation rollers 13, shafts 14, and their respective pulleys 15. All of the pulleys 15 are interconnected by V-belts 30. To transfer the drive from the second conveyor section 10' to the third conveyor section 10", the following means are provided. A pulley 31 is keyed to the shaft 14 at the other end of the second conveyor section 10' and another pulley 32 is keyed to the shaft 14 at the one end of the third conveyor section 10". Mounted in vertical alignment with pulleys 31 and 32 on vertical support 11" is another pulley 33 such that a V-belt 34 trained about pulleys 31-32-33 will transfer the power from V-belt 25 of conveyor section 10' to V-belt 30 of the third conveyor section 10". This arrangement of pulleys between the second conveyor section 10' and the third conveyor section 10" is similar to that shown in FIG. 4 which is the transfer of power from the first conveyor section to the second conveyor section 10'. A plurality of longitudinally spaced tension control means 35 are suitably adjustably mounted on horizontally extending frame members 12 through screw means 36. Tension control means 35 has a pair of upwardly extending leg members 37 and 38 (FIG. 5) whose uppermost end portion supports suitable bearing means which in turn support a drive roll 39 for engaging the drive belts 22, 25 and 30. By tightening up on screw means 36, the respective rollers 39 are moved into rolling engagement with the respective belts that drive the rollers 13 and the pulleys 15. By driving each roller in a positive manner there is greater safety in cleaning the rollers from any overspray since there is always an adjacent roller operative to move any object thrust between rollers to push the object out and away.

A pair of spaced bracket means 40 and 41' support cement spray means 41 and 41' and is suitably secured to the frame member 12. Spray means 41 and 41' are substantially identical in construction except that the nozzle means are directed upward in the case of the spray means 41 while the nozzle means of spray means 41' are directed downwardly. Only the spray means 41 will be described. The spray means 41 includes a pair of laterally spaced support members 42 and 43 (FIG. 2) interconnected by a pair of guide rods 44 and 45. Support member 42 has a threaded nut 46 secured thereto through which a hollow threaded rod 47 is received. Hollow rod 47 journals for rotation therein a shaft 48 which has one end portion 49 threaded opposite to that of adjacement portion 50 with a smooth cylindrical portion 51 therebetween. Mounted for sliding movement on guide rods 44 and 45 are three slide blocks 52, 53 and 54. Slide block 53 is intermediate the respective end blocks 52 and 54 having a central bore 55 therein housing a bearing 56 which engages the smooth portion 51 of threaded shaft 48 whereby rotation of threaded shaft 48 will not affect the position of slide block 53. Slide blocks 52 and 54 have threaded nuts 57 and 58 respectively threadedly engaging threaded portions 49 and 50 respectively whereby rotation of shaft 48 moves the slide members 52 and 54 toward each other or away from each other in accordance with the direction of rotation of shaft 48. The one end of hollow shaft 47 has a clutch plate 60 secured thereto, with a notch 61 on one face portion thereof. The one end of threaded shaft 48 has a clutch plate 62 secured thereto and similarly has a notch 63 on one of the face portions thereof. Journaled for rotation on threaded shaft 48 adjacent to the one end of threaded shaft 48 is an axially slidable clutch member 64 having a handle 65 secured thereto. Clutch member 64 is operative to engage either clutch plate 60 or clutch plate 62 to selectively rotate either shaft 47 or shaft 48.

Extending outwardly from slide block member 52 is a plate member 67 having a plate member 68 secured thereto. A spray head 70 is secured to the plate member 68 by an L-shaped bracket 71 with a screw 72 extending through vertical slot 69 in bracket 71 to permit the vertical adjustment relative to the plate member 67. Spray head 70 has a passageway therethrough with a nozzle 73 on one end thereof and a cement conveying conduit 74 at the other end.

Extending outwardly from the slide block 54 is a plate member 75 with a vertically disposed plate member 76 to which is secured an L-shaped bracket 77. Bracket 77 is adjustably secured to plate member 76 as by a bolt 78 extending through a vertically disposed slot 79 in bracket 77 and threadedly connected to plate member 76. A spray head 80 is suitably secured to the plate member 76 and has a nozzle 81 secured to the upper end portion thereof. Spray head 80 has a passageway therethrough with a cement conveying conduit 82 conveying a cement or an adhesive to such passageway for delivery to the nozzle 81 and a cement conveying conduit 83 for delivering the excess cement or adhesive to a return reservoir 84.

The centrally located slide block 53 has an outwardly extending plate member 85 to which is secured a plate member 86. An L-shaped bracket 87 is adjustably secured to the plate member 85 by a bolt 88 extending through a slot 89 in bracket 87 and threadedly secured to plate member 86. A pair of spray heads 90 and 91 are mounted on a cross brace 92 which is suitably secured to the L-shaped bracket 87 for vertical adjustment relative to the plate member 86. Spray head 90 has a passageway therethrough with a nozzle 95 on one end thereof and a cement conveying conduit 96 at the other end interconnecting the passageway in spray head 90 with the passageway in the spray head 70. Spray head 91 similarly has a passageway therethrough with a nozzle 97 on one end and a cement conveying conduit 98 at the other end interconnecting the passageway in spray head 90 with the passageway in the spray head 91.

The conduit 74 to spray head 70 is connected to a suitable source of cement such as a tank 99 under pressure, which forces the cement or adhesive to the respective spray heads 70, 90, 91, and 80, thence via conduit 83 to return reservoir 84. Reservoir 84 and supply tank 99 may be suitably interconnected to recycle the cement. The respective spray heads 70', 90', 91', and 80' of spray means 41 are substantially identical to the spray heads 70, 90, 91, and 80.

Mounted opposite to the spray means 41 is a cement spray collector means 100 having a supply roll 101 of hardware cloth mounted for rotation on bracket means 102. A take up roll 103 is mounted on bracket 104. A drive motor 105 is suitably mounted on bracket 104 and has its output connected to take up roll 103 for winding up the hardware cloth thereon in a manner to be described. Idler rollers 106 and 107 are journaled for rotation on brackets 102 and 104 respectively. The hardware cloth on supply roll 101 is directed around rollers 106 and 107 to take up roll 103 to provide a flat run 110 that is closely adjacent to the rollers 13 on conveyor section 10. Thus the flat run portion 110 of the hardware cloth is in a position to collect any overspray from the oppositely located spray heads 70, 90, 91, and 80. To provide suitably ventilation for the solvents contained in the cement or spraying materials a vent hood 112 is positioned directly above the flat run 110 and is suitably vented.

Mounted opposite to the spray means 41' is the cement spray collector means 115 having a supply roll 116 of hardware cloth directing the hardware cloth past a pair of spaced idler rollers 117, 118 to present a flat collecting run 119. The hardware cloth is wound up onto take up roll 120 driven by a motor 121. A vent hood 125 is mounted adjacent to the flat collecting run 119 to vent the solvent vapors from the cement materials of cement spray means 41'.

To control the spray from the spray control means 41, photo electric cells P and P1 are mounted to project a light beam therebetween, which light beam is broken by a tread section being conveyed upon rollers 13 as it passes from conveyor section 10' to 10. A second set of photo electric cells P2 and P' are mounted on vertical supports 11' to project a light beam therebetween, which light beam is broken by the passage of a tread section from the first conveyor section 10" to second conveyor section 10'.

A modification of the spray collection means is shown in FIG. 9 wherein the second conveyor section 10' is identical to that described above having a plurality of rollers 13, spray means 41', and tension control means 35. Guide rails 130-131 are suitably supported beneath the spray means 41' to provide support for a tank 135. Tank 135 has a replaceable collector cloth 136 positioned within tank 135 to collect the overspray from the spray means 41'. A vent hood 140 is mounted laterally spaced from the tank 135 to collect the fumes and exhaust vapor from the cement spray. Such vent hood 140 is suitable powered by an exhaust fan for collection and filtering to a central station. Such laterally spaced vent hood relative to the downwardly directed spray is effective in those instances where there is no intervening collector medium such as the cloth medium.

The electric control circuitry for the tread cementer is shown in FIG. 6. The main current source is supplied over leads L1, L2, and L3. These leads are connected to the conveyor motor 19 through switch M1; to the vent screen motors 105 and 121 through switch M2; and the motor 150 for vent hoods 112 and 125 through switch M3.

Branching off from these leads, through a transformer 151 is a control circuit consisting of two parallel leads 152-153. A first cross conductor 154 between leads 152 and 153 supplies the current for actuating relay M1 closing switches M1 on leads L1, L2, and L3 and switch M1 on cross lead 154 for the conveyor motor 19 upon depression of start switch 155. A cross conductor 156 is connected to a normally closed switch T1, which also is connected to relay M3 which closes switch M3 on leads L1, L2, and L3 for energizing the vent screen motor for advancing the filter screen via actuation of motors 121 and 105, and also closes switch M3 on cross conductor 160 to actuate relay T1 and on cross conductor 159 to actuate relay T4. An open jog switch 158 is interposed in cross conductor 156 to manually actuate relay M3. Relay T-1 on cross conductor 160 is operative to actuate the timer for the screen motors 105 and 121. Cross conductor 161 and 160 is connected to control relay T1 with normally open switch M3 and to relay M3 via normally open switch ES-1.

A counter ES-1 is interposed between leads 170 and 171. Counter ES-1 counts the number of sprays onto the tread by the spray means and upon a predetermined number thereof closes the contacts or switches ES-1 on cross lead 161 so as to energize relay T-1 to advance the filter screen via actuation of motors 121 and 105 in a manner to be described. Counter ES-1 has an open switch T2 across leads 10 and 11 thereof and a normally closed switch T4 across leads 7 and 8. A timer ES-2 for controlling the spray means 41 is interposed between leads 170 and 171. Timer ES-2 times the distance from the front of the tread as it passes under photo-cell P1 to control the actuation of the lower spray means 41. Timer ES-2 is actuated by any combination of a plurality of open switches CR-1, CR-2, and CR-3 interposed across conductors 175 and 176 connected to leads 6 and 7. A timer ES-3 across leads 170 and 171 times the distance from the back of the tread as the tread passes under photo-cell P2 to control the upper spray means 41'. Timer ES-3 is actuated by the closing of contact P2.

Timer ES-4 and ES-5 located on cross leads 172 and 173 respectively control the length of time that the spray means 41 and 41' respectively are on. Timer ES-4 operates solenoid valve SV-1 while timer ES-5 operates solenoid SV-2.

The photo cell arrangement for actuating the timers is located on cross leads 175 and 176 with P being the light source for the bottom spray means 41 and P' being the light source for the top spray means 41'. Such respective light sources P and P' cooperate with amplifiers P1 and P2 in a manner to be described.

Relay M4 is located on cross lead 177 with stop and start switch 178 and 179 thereon. Actuation of the relay M4 closes switch M4 to activate the vent motor 150 which continues to operate until the stop switch 178 is manually operated to break the electrical circuit to the motor 150. Switch 180 on cross lead 181 and cross lead 154 is a safety switch.

Figure 7:
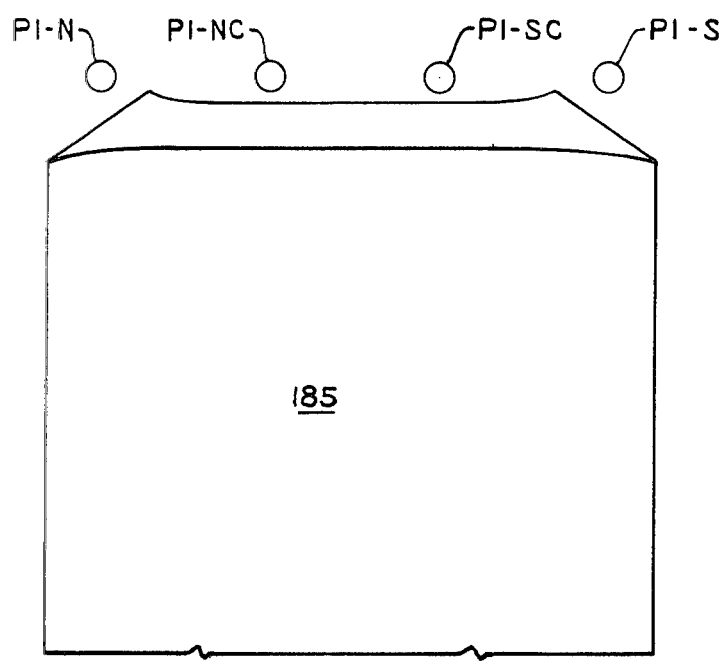
FIG. 7 is a plan view of the forward end portion of a tread.

Photo light cells P1-N, P1-NC, P1-SC, and P1-S are all associated with oppositely disposed light sources P for the bottom spray unit 41 with the photo light cells located laterally across the path of the tread 185 as shown diagrammatically in FIG. 7 with only one photo cell P1 in FIG. 1 to indicate the general location of these photo light cells. A similar set of photo light cells are located for the top spray unit laterally across the tread pass line indicated as P2 in FIG. 1. The switches CR-1 CR-2 or CR-2 CR3, or CR3 CR4 are paired directly above timer ES-2 such that the timer does not operate unless any two pair of switches are closed wherein the switches CR-1, CR-2, CR-3, and CR-4 are controlled by photo cells P1-N, P1-NC, P1-SC, and P1-S respectively (leads 190, 191, 192, and 193).

In the operation of the tread cementer unit, the operator begins the operation by depressing start switch 155 which energizes relay M1 closing switches M1 to actuate conveyor motor 19. Assuming treads are on the conveyor, such treads 185 are conveyed with the leading edge 186 (FIG. 1) tapered back and downwardly while the trailing edges 187 taper forwardly and upwardly (FIG. 1) as viewed in side elevation. As the first tread section's leading edge intercepts the light beam between light source P' and photo cell P2, timer ES-3 is energized to start the timer. After a predetermined time interval, switch ES-3 on lead 195 is closed thereby energizing relay ES-5 which then actuates solenoid SV-2 which sprays cement from the top spray means 41'. Timer ES-5 on lead 173 determines the length of time that the sprayer is on to assure that only the upwardly tapering edge 186 is sprayed with cement. The tread section then is conveyed by the rollers 13 past light source P to actuate timer ES-2 which then closes switch ES-2 which actuates relay ES-4. Relay ES-4 controls the bottom spray means 40 and length of time that such spray means is left on to assure the precise spray control of the upwardly tapered leading edge of a tread section. Counter ES-1 counts the number of actuations of the spray means and after a predetermined number energizes, switch ES-1 on lead 161 which energizes motor 105 and 121 to advance the hardware cloth screen filter which has controlled the overspray from the cement spray means 41 and 41' to present a new section of screen filter or collector material to the control area. The hardware cloth is electrically grounded.

A modification of the described embodiment is shown in FIG. 9 wherein a trapezoidal shaped tank 135 open along the top collects the overspray from the top spray means 41'. In all of these instances where the spray means 41 and 41' spray a cement onto the tire tread edges or ends, the vent motor 150 through the vent hoods 112, 125, and 140 collect the fumes to remove the vapor from the surrounding work area.

It will be apparent that although a specific embodiment and certain modifications have been described in detail, the invention is not limited to the specification illustrated and described constructions since variations may be made without departing from the principles of the invention.

I claim:

1. A method for applying cement to the respective ends of a tread slab of predetermined length comprising the steps of conveying a tread slab in a longitudinal direction with said tread slab having a forwardly disposed and rearwardly disposed tapering ends, spraying cement adhesive downwardly only onto one of said tapering ends while said tread slab is being conveyed, spraying cement adhesive upwardly onto the other one of said tapering ends while said tread slab is being conveyed, and collecting the respective oversprays from said spraying onto said tread edges.

2. A method for applying cement as set forth in claim 1 wherein said collection of the overspray is moved from the overspray area and a new collecting overspray means is presented for collecting the overspray.

3. A method for applying cement to the respective ends of a plurality of moving tread slab of predetermined length comprising the steps of conveying a plurality of longitudinally spaced tread slab in a longitudinal direction with each of said tread slabs having a forwardly disposed and rearwardly disposed tapering end, spraying cement adhesive intermittently downwardly onto only one of the tapering end of said slabs while said one end is being conveyed past a first preselected location, spraying cement adhesive intermittently upwardly onto only the other tapering end of each of said tread slabs while being conveyed past a second preselected location, collecting the respective oversprays from said spraying onto a collector means, and intermittently presenting new surface areas of said collector means for collecting the overspray.

* * * * *